US009430634B1

(12) United States Patent
Dotan et al.

(10) Patent No.: US 9,430,634 B1
(45) Date of Patent: Aug. 30, 2016

(54) AUTHENTICATION USING GESTURE PASSWORDS

(71) Applicant: EMC Corporation, Hopkinton, MA (US)

(72) Inventors: Yedidya Dotan, Newton, MA (US); Daniel V. Bailey, Pepperell, MA (US); Lawrence N. Friedman, Arlington, MA (US); Gareth Richards, Woodstock (GB)

(73) Assignee: EMC Corporation, Hopkinton, MA (US)

( * ) Notice: Subject to any disclaimer, the term of this patent is extended or adjusted under 35 U.S.C. 154(b) by 168 days.

(21) Appl. No.: 14/224,303

(22) Filed: Mar. 25, 2014

Related U.S. Application Data

(63) Continuation-in-part of application No. 14/143,779, filed on Dec. 30, 2013.

(60) Provisional application No. 61/894,658, filed on Oct. 23, 2012.

(51) Int. Cl.
H04L 29/06 (2006.01)
G06F 21/36 (2013.01)

(52) U.S. Cl.
CPC ..................... G06F 21/36 (2013.01)

(58) Field of Classification Search
CPC .......................... G06F 21/32–21/36
USPC .............................. 726/19; 713/183
See application file for complete search history.

(56) References Cited

U.S. PATENT DOCUMENTS 6,038,595 A    3/2000  Ortony
8,453,232 B1   5/2013  Gallagher et al.
8,656,455 B1   2/2014  Bailey et al.
8,701,199 B1   4/2014  Dotan et al.
8,726,405 B1   5/2014  Bailey et al.
8,752,144 B1   6/2014  Kaufman et al.
8,752,146 B1   6/2014  van Dijk et al.
8,756,672 B1 * 6/2014  Allen ............... G06F 21/36
                                              345/173
8,782,775 B2   7/2014  Fadell et al.
8,813,026 B1   8/2014  Vobugari et al.
8,881,251 B1 * 11/2014 Hilger ............... H04L 63/083
                                              713/183
8,886,751 B1  11/2014  Hackett
8,955,076 B1   2/2015  Faibish et al.

(Continued)

OTHER PUBLICATIONS

Chiasson et al., "The MVP Web-Based Authentication Framework", pp. 16-24, 2012, LNCS 7397.*

Primary Examiner — Izunna Okeke
Assistant Examiner — Hee Song
(74) Attorney, Agent, or Firm — BainwoodHuang

(57) ABSTRACT

A technique provides user authentication using a smart device (e.g., a smart phone, a tablet, etc.). The technique involves displaying, by processing circuitry of a smart device, a password prompt on a touch screen of the smart device. The password prompt includes a motion video of touch screen gestures to prompt a user of the smart device to enter a gesture password. The technique further involves receiving, by the processing circuitry, a trial gesture password entered by the user via the touch screen. The trial gesture password includes a user-entered sequence of touch screen gestures. The technique further involves performing, by the processing circuitry, multiple gesture password confirmation operations to verify that the user is able to re-enter the trial gesture password via the touch screen over time to authenticate the user to the smart device.

21 Claims, 11 Drawing Sheets

(56) References Cited

U.S. PATENT DOCUMENTS

| | | |
|---|---|---|
| 9,119,539 B1 | 9/2015 | Dotan et al. |
| 2004/0066274 A1* | 4/2004 | Bailey ............... G06F 21/34 340/5.3 |
| 2006/0053285 A1 | 3/2006 | Kimmel et al. |
| 2006/0206919 A1 | 9/2006 | Montgomery et al. |
| 2010/0322485 A1 | 12/2010 | Riddiford |
| 2012/0124654 A1* | 5/2012 | Senac ............... G06F 21/36 726/7 |
| 2012/0166998 A1* | 6/2012 | Cotterill ............ G06F 3/0483 715/780 |
| 2012/0304284 A1* | 11/2012 | Johnson ............ H04L 9/3226 726/19 |
| 2014/0189819 A1* | 7/2014 | Grimaud ............ G06F 21/36 726/5 |
| 2014/0223378 A1 | 8/2014 | Sinha |

\* cited by examiner

AUTHENTICATION USING GESTURE PASSWORDS

CROSS REFERENCE TO RELATED APPLICATIONS

This patent application is a Continuation-in-Part of U.S. patent application Ser. No. 14/143,779 filed on Dec. 30, 2013, entitled "AUTHENTICATION USING COLOR-SHAPE PAIRINGS", which claims the benefit of U.S. Provisional Patent Application No. 61/894,658 filed on Oct. 23, 2013, entitled "AUTHENTICATION USING COLOR-SHAPE PAIRINGS". Additionally, this patent application claims the benefit of U.S. Provisional Patent Application No. 61/894,658. The contents and teachings of U.S. patent application Ser. No. 14/143,779 and U.S. Provisional Patent Application No. 61/894,658 are hereby incorporated by reference in their entirety.

BACKGROUND

A conventional screen locking mechanism for a mobile platform requires its owner to enter a correct personal identification number (PIN). A typical PIN length for this PIN-based screen locking mechanism is four to six digits. If the entered PIN is correct, the screen locking mechanism unlocks the screen and allows the owner to access the resources of the mobile platform. However, if the entered PIN is incorrect, the screen locking mechanism keeps the screen locked thus denying access to the resources of the mobile platform.

Another conventional screen locking mechanism for a mobile platform requires its owner to trace a pattern over an array of dots. A typical array configuration for this pattern-based screen locking mechanism is a 3×3 dot matrix or a 4×4 dot matrix. If the owner traces the correct pattern over the array of dots, the screen locking mechanism unlocks the screen. However, if the owner does not trace the correct pattern over the array of dots, the screen locking mechanism keeps the screen locked. A conventional pattern-based screen locking mechanism which is similar to that described above is the Android Dot Locker App by SolarSpark Productions.

SUMMARY

Unfortunately, there are deficiencies to the above-described conventional screen locking mechanisms for mobile platforms. For example, in connection with the above-described conventional PIN-based screen locking mechanism, some mobile platforms generate keys from PINs. That is, the entered PINs are provided as inputs to key derivation algorithms which derive keys from the entered PINs. The derived keys are then used to access resources such as mobile applications, services, confidential data, and so on. However, since a typical PIN is only four to six digits in length, most keys generated from PINs have very low entropy (e.g., 10-17 bits) thus providing relatively weak security.

To strengthen security, one might consider imposing a requirement that such PINs be longer than six digits. Unfortunately, it is inconvenient and burdensome for an average human to remember relatively long PINs.

Likewise, in connection with the above-described conventional pattern-based screen locking mechanism, it is inconvenient and burdensome for an average human to remember relatively sophisticated tracing patterns. Accordingly, even though pattern tracing may be able to provide higher entropy and thus stronger security than that of the four to six digit PINs of the above-described conventional PIN-based screen locking mechanism, it may be just as onerous for an average human to remember how to correctly trace patterns over an array of dots.

In contrast to the above-described conventional screen locking mechanisms, improved techniques are directed to authentication using gesture passwords where smart devices verify effective user recall before committing users to using the gesture passwords. In particular, the smart devices put their users through an enrollment process having multiple phases. First, the smart devices play training videos and allow users to practice entering their gesture passwords (e.g., a training phase). Additionally, the smart devices confirm that the users are able to competently re-enter their gesture passwords over time (e.g., a proving phase) before graduating the users so that the users thereafter use gesture passwords to authenticate (e.g., a graduated phase). Such operation enables a user to opt out or revert back to a standard password mechanism (e.g., conventional PINs) if the user decides that gesture password authentication is too difficult or demanding. However, a user that continues and eventually completes the enrollment process is able to effectively and reliably remember and enter a gesture password which provides high entropy and thus relatively strong security.

One embodiment is directed to a method of providing user authentication. The method includes displaying, by processing circuitry of a smart device, a password prompt on a touch screen of the smart device. The password prompt includes a motion video of touch screen gestures to prompt a user of the smart device to enter a gesture password. The method further includes receiving, by the processing circuitry, a trial gesture password entered by the user via the touch screen. The trial gesture password includes a user-entered sequence of touch screen gestures. The method further includes performing, by the processing circuitry, multiple gesture password confirmation operations to verify that the user is able to re-enter the trial gesture password via the touch screen over time to authenticate the user to the smart device.

In some arrangements, displaying the password prompt on the touch screen of the smart device includes generating a random gesture password which includes a random sequence of touch screen gestures, and outputting the random gesture password on the touch screen. In these arrangements, the randomness of the random gesture password enable the user to securely use the random sequence of touch screen gestures as the trial gesture password. Along these lines, the user can simply copy or trace over the random sequence of touch screen gestures (i.e., practice during a practice phase) and thus use the random sequence of touch screen gestures or a portion of the sequence as the user's gesture password. Since the sequence of touch screen gestures is random, each smart device is able to play a different sequence of touch screen gestures so that the gesture passwords differ among smart devices.

In some arrangements, performing the multiple gesture password confirmation operations includes:
 (i) re-prompting the user to enter the trial gesture password via the touch screen,
 (ii) in response to re-prompting the user to enter the trial gesture password, acquiring user input as the user attempts to re-enter the trial gesture password via the touch screen in response to re-prompting, and
 (iii) based on the user input, assessing ability of the user to re-enter the trial gesture password.

Here, the smart device is able to confirm that the user is able to competently re-enter the trial gesture password (e.g., a proving phase).

In some arrangements, assessing the ability of the user to re-enter the gesture password includes detecting a graduation event in which the user satisfies a set of gesture password entrance criteria, and converting the trial gesture password into an actual gesture password of the user in response to detection of the graduation event. For example, the smart device may have determined that the user has correctly entered the gesture password a predefined number of times over a set of predefined increasing time intervals. In these arrangements, the user demonstrates the ability to remember and re-enter the gesture password thus enabling the smart device to thereafter use the gesture password to authenticate the user.

In some arrangements, converting the trial gesture password into the actual gesture password of the user includes generating a gesture password cryptographic key based on the actual gesture password and, after the gesture password cryptographic key is generated, imposing a need for the gesture password cryptographic key to access a set of protected resources. At this point, in lieu of the new gesture password cryptographic key, use of any standard password (e.g., a PIN) can be deactivated, and any key derived from the standard password can be deleted from the smart device.

In some arrangements, prior to displaying the password prompt on the touch screen of the smart device, the smart device temporarily saves a standard password cryptographic key used to unlock access to a set of protected resources. In these arrangements, the smart device is capable of receiving a cancellation command from the user, the cancellation command indicating that the user no longer wishes to switch to using the trial gesture password during authentication and, in response to the cancellation command, re-instating use of the standard password cryptographic key to unlock access to the set of protected resources. Thus, the user is able to cancel enrollment and continue to use the standard password cryptographic key to unlock access to the set of protected resources.

Another embodiment is directed to a smart device which includes a touch screen, memory, and control circuitry coupled to the touch screen and the memory. The memory stores instructions which, when carried out by the control circuitry, cause the control circuitry to:
(A) display a password prompt on the touch screen, the password prompt including a motion video of touch screen gestures to prompt a user of the smart device to enter a gesture password,
(B) receive a trial gesture password entered by the user via the touch screen, the trial gesture password including a user-entered sequence of touch screen gestures, and
(C) perform multiple gesture password confirmation operations to verify that the user is able to re-enter the trial gesture password via the touch screen over time to authenticate the user to the smart device.

Suitable hardware for the smart device includes a smart phone, a tablet, a laptop with touch pad, other computerized hardware equipped with an electronic component to sense user gestures, and so on.

Another embodiment is directed to a computer program product having a non-transitory computer readable medium which stores a set of instructions to provide user authentication. The set of instructions, when carried out by computerized circuitry, causes the computerized circuitry to perform a method of:

(A) displaying a password prompt on a touch screen of a smart device, the password prompt including a motion video of touch screen gestures to prompt a user of the smart device to enter a gesture password;
(B) receiving a trial gesture password entered by the user via the touch screen, the trial gesture password including a user-entered sequence of touch screen gestures; and
(C) performing multiple gesture password confirmation operations to verify that the user is able to re-enter the trial gesture password via the touch screen over time to authenticate the user to the smart device.

Suitable non-transitory computer readable media include CD-ROM, DVD, flash memory, disk memory, tape memory, other non-volatile storage equipment, and the like.

It should be understood that a variety of graphical passwords are suitable for use as the gesture password. Along these lines, the smart device can display a set of color segments on the touch screen, and render multiple shapes within each color segment displayed on the touch screen (e.g., a wheel of colors and shapes). To acquire the trial gesture password from user, the smart device obtains a series of color-shape pairings in response to the user touching touch screen locations over particular shapes residing in particular color segments.

As another example, the smart device can (i) render a color palette on the touch screen, the color palette including multiple selectable colors, and (ii) render a shape menu on the touch screen, the shape menu including multiple selectable shapes. To acquire the trial gesture password from user, the smart device obtains a series of color-shape pairings in response to the user providing drag and drop gestures over touch screen locations to associate particular colors with particular shapes.

As yet another example, the smart device can render an array of markers (e.g., a 3×3 dot matrix, a 4×4 dot matrix, an N×M array of shapes or other graphics/objects, etc.) on the touch screen. To acquire the trial gesture password from user, the smart device obtains a series of user gestures in response to the user moving a finger relative to the array of markers (e.g., finger swipes, finger traces from one screen location to another screen location, etc.).

Other embodiments are directed to electronic systems and apparatus, processing circuits, computer program products, and so on. Some embodiments are directed to various methods, electronic components and circuitry which are involved in authentication using gesture passwords.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Overview

An improved technique is directed to user authentication using a gesture password (e.g., a sequence of touch screen user gestures) where a smart device verifies the ability of a user to recall the gesture password before committing the user to using the gesture password for authentication. Along these lines, the smart device puts the user through an enrollment process having multiple phases. In an initial training phase, the smart device plays a training video and allows the user to practice entering a gesture password. In a subsequent proving phase, the smart device confirms that the user is able to competently re-enter the gesture password over time (e.g., over increasing time intervals) before graduating the user so that the user thereafter uses the gesture password to authenticate. Such operation enables the user to opt out or revert back to a standard password mechanism (e.g., a conventional PIN-based password) if a user decides that gesture password authentication is too difficult or demanding. However, a user that completes the enrollment process is able to then, during a graduated phase, easily remember and enter a gesture password which provides higher entropy and thus stronger security.

A variety of graphical password types are suitable for use as the gesture password. One type of graphical password includes a sequence of color-shape pairings. Such use of color-shape pairings is capable of providing greater unpredictability than that provided by conventional standard passwords (e.g., PINs). Furthermore, depending on how an interface is presented to a user, the interface may enable the user to easily remember enough color-shape pairings to generate substantially higher entropy than that available from conventional standard passwords. For instance, multiple color-shape pairings in combination with a healthy set of device stable values can offer at least 128 bits for generation of an effective cryptographic key.

Figure 1:
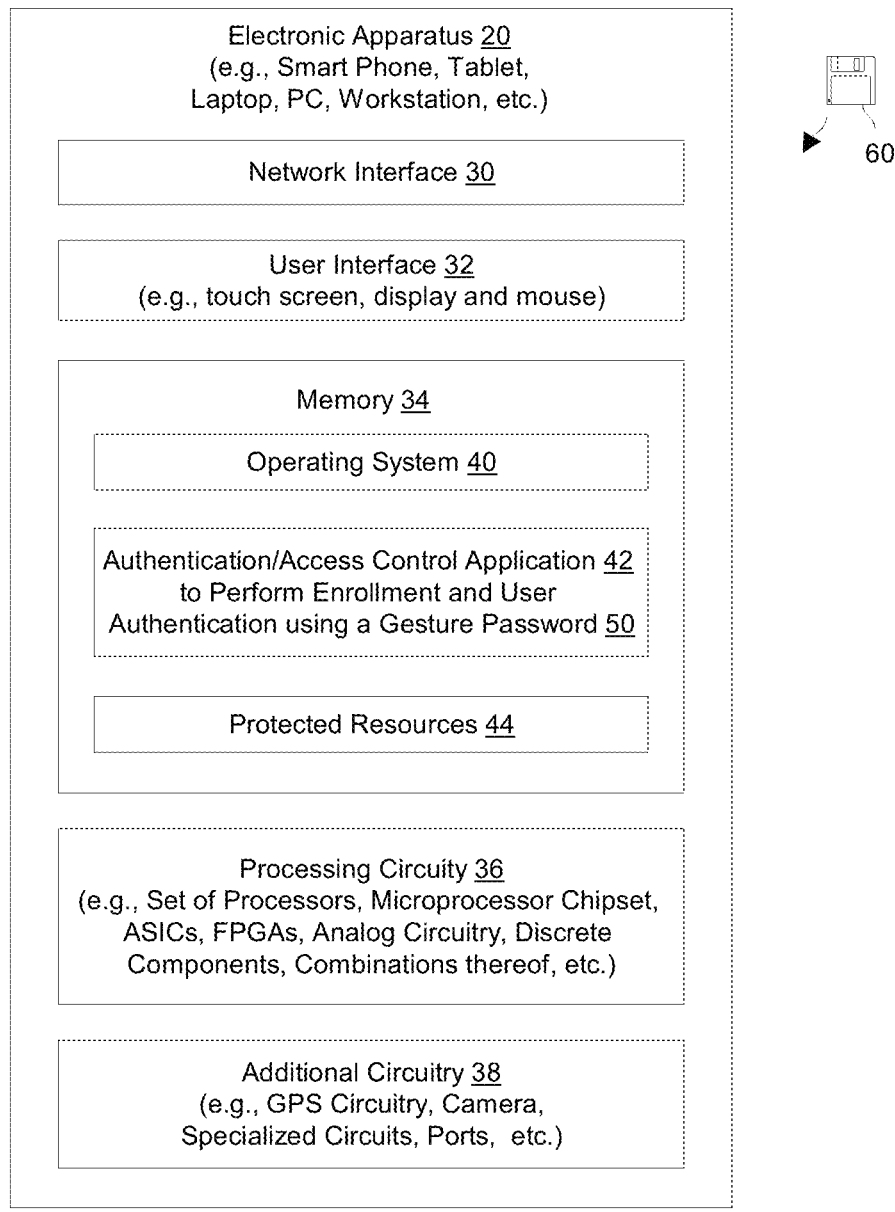
FIG. 1 is a block diagram of an electronic apparatus which is suitable for authentication and providing access control using gesture passwords.

FIG. 1 shows an electronic apparatus 20 which is suitable for authentication and providing access control using a gesture password such as a series of user-identified color-shape pairings. The electronic apparatus 20 includes a network interface 30, a user interface 32, memory 34, processing circuitry 36, and additional circuitry 38. Suitable apparatus include smart devices (e.g., smart phones, tablets, personal assistants, etc.), general purpose computers (e.g., desktop computers, workstations, laptops, etc.), specialized computer equipment (e.g., interfaces to navigational equipment, games, smart TVs, other controls, etc.) and so on.

The network interface 30 is constructed and arranged to connect the electronic apparatus 20 to a communications medium (e.g., the Internet, a LAN, a VPN, the network of an enterprise, etc.). Accordingly, the network interface 30 enables the electronic apparatus 20 to communicate with the other components of an electronic environment such as protected resource servers, and so on. Such communications may be copper-based or wireless (i.e., IP-based, SAN-based, cellular, Bluetooth, combinations thereof, and so on).

The user interface 32 is constructed and arranged to receive user input from, and provide user output to a user of the electronic apparatus 20. In the context of a smart device such as a smart phone, a tablet, etc., the user interface 32 can include, among other things, a touch screen that receives coordinate selections in response to user touches, as well as other types of user gestures (e.g., swiping motions, finger traces, etc.).

It should be understood that nothing precludes the improvements that are described herein from being applied directly to, or with minor modification to, a standard computer. For example, in the context of a laptop, personal computer, or user workstation, the user interface 32 can include a keyboard, a pointing device (e.g., a mouse, a touch pad, a trackball, etc.), a keyboard, an electronic display or monitor, and so on.

The memory 34 is intended to represent both volatile storage (e.g., DRAM, SRAM, etc.) and non-volatile storage (e.g., flash memory, magnetic disk drives, etc.). The memory 34 stores a variety of software constructs including an operating system 40 to control allocation of resources within the electronic apparatus 20, an authentication/access control application 42, and protected resources 44 (e.g., access to applications, content, sensitive data, peripherals, etc.). As will be explained in further detail shortly, the authentication application 42 enables the electronic apparatus 20 to guide a user through a gesture password enrollment process, and then perform authentication/access control based on a gesture password 50 (e.g., a series of color-shape pairings entered via the user interface 32).

The processing circuitry 36 is constructed and arranged to operate in accordance with the various software constructs stored in the memory 34. Such circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 60 is capable of delivering all or portions of the software to the electronic apparatus 20. The computer program product 60 has a non-transitory (or non-volatile) computer readable medium that stores a set of instructions that controls one or more operations of the electronic apparatus 20. Examples of suitable computer readable storage media include tangible articles of manufacture and apparatus which store instructions in a non-volatile manner such as CD-ROM, DVD, flash memory, disk memory, tape memory, and the like.

The additional circuitry 38 includes other hardware that is available to the electronic apparatus 20. Such hardware can include a communications interface (e.g., a cellular communications interface, a telephone interface, etc.), specialized circuitry (e.g., a camera, a microphone, a speaker, etc.), input/output ports, and so on.

During operation, the processing circuitry 36 executes software constructs stored in the memory 34 in order to enable the user to perform useful work. Along these lines, the processing circuitry 36 when executing the operating system 40 is able to manage various computerized resources such as memory space, processing cycles, and so on. Examples of useful work includes accessing one or more protected resources 44 (e.g., viewing a file, reading email, performing a banking transaction, etc.). Such operation may further involve access to local protected resources 44 of the electronic apparatus 20 (e.g., to unlock a screen of the electronic apparatus 20, to access/run certain apps, to access to locally stored data, etc.). Alternatively or in combination, such operation may involve access to remote protected resources 44 of external protected resource servers (e.g., remote login access, remote access to content, ability to complete remote transactions, etc.). Other access control activities include installing apps, connecting to different networks, accessing enterprise resources, and so on. Some electronic apparatus 20 may be equipped with special peripherals that enable users to perform additional operations upon successful authentication such as make cellular calls, navigate using maps and GPS circuitry, take pictures, and so on.

Additionally, the processing circuitry 36 when executing the authentication application 42 is able to guide a user through gesture password enrollment and then control access to the protected resources 44 based on a gesture password 50. In some arrangements, the entered gesture password 50 or portions of the gesture password 50 are provided as input to a key derivation algorithm to create (or unlock) cryptographic keys which enable access to the protected resources 44. In other arrangements, the entered gesture password 50 is matched against an expected gesture password 50 (or gesture password hashes are compared) to determine whether authentication is successful. Other authentication arrangements are suitable for use as well. Further details will now be provided with reference to FIG. 2.

Figure 2:
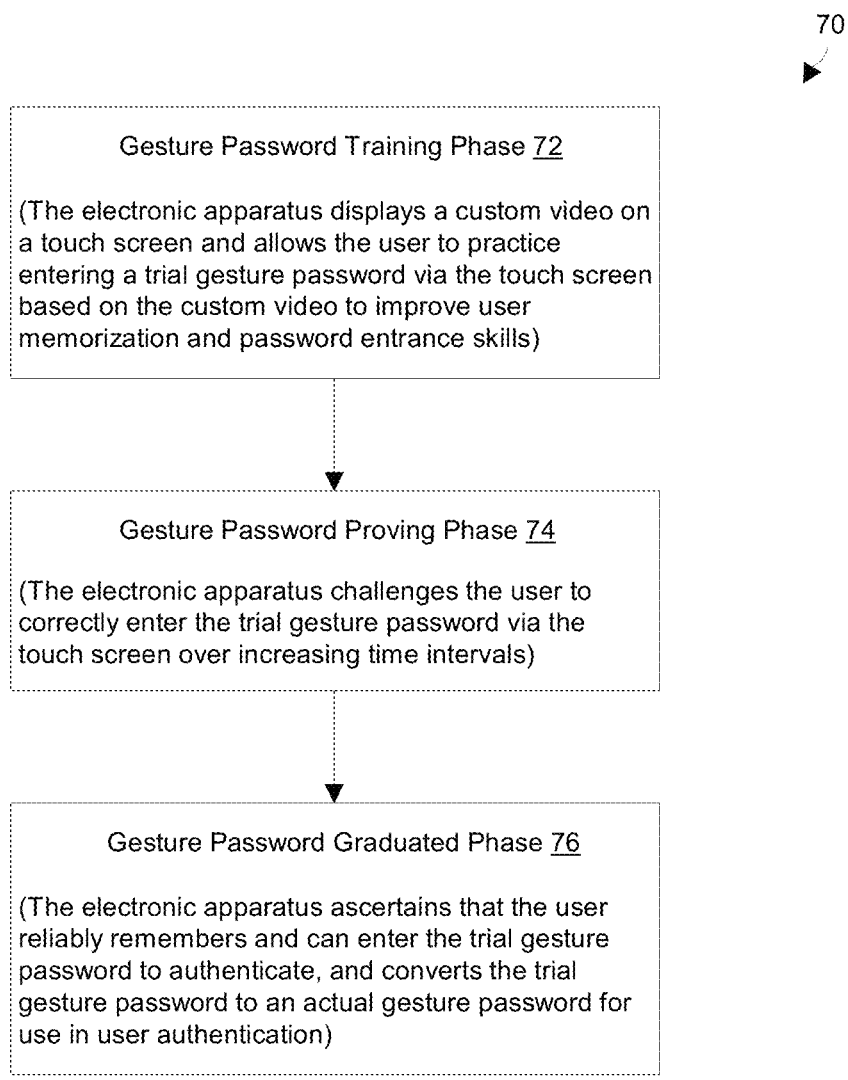
FIG. 2 is a block diagram of a gesture password enrollment process.

FIG. 2 shows a gesture password enrollment process 70 which is divided into a series of phases. In particular, the gesture password enrollment process 70 includes a gesture password training phase 72, followed by a gesture password proving phase 74, followed by a gesture password graduated phase 76. The gesture password enrollment process 70 may be initiated by launching the authentication application 42 (FIG. 1). In some arrangements, the user may need to successfully authenticate using a conventional standard password before beginning the enrollment process 70.

During the gesture password training phase 72 of the enrollment process 70, the electronic apparatus 20 (FIG. 1) displays a custom video on a touch screen (or using similar hardware) and allows the user to practice entering a trial gesture password 50 via the touch screen based on the custom video. The custom video teaches the user what a gesture password looks like, and how the user should operate the touch screen (e.g., by touching, swiping and/or tracing over certain screen locations, etc.) in order to properly enter the gesture password 50. The user then enters a trial gesture password 50 by touching, swiping and/or tracing, etc. over certain screen locations on the touch screen.

The user may be creative and decide to design a trial gesture password 50 which differs from what is displayed in the custom video. However, it should be understood that different custom videos are displayed on different electronic apparatus 20. In some arrangements, no two electronic apparatus 20 play the same custom video. Accordingly, the user can simply copy, as the entered trial gesture password 50, the gesture password played by the touch screen by precisely touching particular screen locations that are highlighted or brightened in the custom video. In this simple copy situation, the entered trial gesture password 50 will still be different across each electronic apparatus 20.

It should be further understood that even though the user has entered a trial gesture password 50, the electronic apparatus 20 is highly forgiving during the training phase 72 in that it can repetitively re-play the custom video as many times as the user likes. Moreover, the electronic apparatus 20 allows the user to practice re-entering the trial gesture password 50 as many times as the user likes. Here, the user is permitted to make mistakes while developing gesture password skills, e.g., the electronic apparatus 20 does not lock out the user after a certain number of unsuccessful attempts. As a result, the user is freely able to improve his/her memorization of the trial gesture password 50 as well as the user's skills in entering the trial gesture password 50.

In some situations, the electronic apparatus 20 presents the gesture password training phase 72 in the manner of a game to make it fun/enjoyable for the user. For example, the electronic apparatus 20 may sample/grade each user attempt and output a score for each user attempt to provide the user with feedback as well as challenge the user to improve. In some arrangements, the electronic apparatus 20 evaluates the password strength of the trial gesture password 50 (e.g., outputs a separate grade indicating how guessable or predictable the trial gesture password 50 is compared to other possible permutations).

Additionally, if the user has been using a standard password (e.g., a PIN-based password), the electronic apparatus 20 buffers the standard password in memory (see the memory 34 in FIG. 1). Accordingly, the user is able to cancel the gesture password enrollment process 70 and revert back to using the standard password if that is what the user wants.

After the gesture password training phase 72, the electronic apparatus 20 enters the gesture password proving phase 74. Such a transition may be in response to a command from the user. Alternatively, such a transition may be in response to expiration of a preset amount of time for the gesture password training phase 72. In some arrangements, the user is able to "reset the clock" by adding more time to the gesture password training phase 72 via a command.

During the gesture password proving phase 74, the electronic apparatus 20 informs the user that the user will be prompted several times in the future to re-enter the trial gesture password 50. Then, the electronic apparatus 20 challenges the user to correctly enter the trial gesture password 50 via the touch screen in accordance with a set of preset criteria. Here, the electronic apparatus 20 performs multiple gesture password confirmation operations to verify that the user is able to reliably re-enter the trial gesture password 50 via the touch screen over time.

In some arrangements, the user must correctly enter the trial gesture password 50 a predefined number of times. Along these lines, the user may be required to correctly enter the trial gesture password 50 into the touch screen N times in a row where N is a predefined integer (e.g., three, four, five, etc.). Accordingly, the electronic apparatus 20 is able to confirm that the user is capable of properly entering the trial gesture password 50.

Additionally, in some arrangements, the electronic apparatus 20 prompts the user to correctly enter the trial gesture password 50 over increasing time intervals. In some arrangements, the electronic apparatus 20 prompts the user to correctly enter the trial gesture password 50 immediately after transitioning to the gesture password proving phase 74. If the user is successful, the electronic apparatus 20 prompts the user again a short time thereafter (e.g., after 30 seconds, after one minute, etc.). If the user is again successful, the electronic apparatus 20 prompts the user a slightly longer time thereafter (e.g., after two minutes, after three minutes, etc.), and so on.

Again, in some arrangements, the electronic apparatus 20 presents the challenges to the user in the manner of a game. In particular, the electronic apparatus 20 evaluates the user's ability to enter the trial gesture password 50 and outputs a grade or score. Such operation encourages the user to improve memorization and dexterity in order to properly enter the trial gesture password 50.

Once the electronic apparatus 20 detects that the user has satisfied the set of preset criteria, the electronic apparatus 20 graduates the user. In particular, the electronic apparatus 20 outputs an indication to the user that the user has passed the gesture password proving phase 74, and transitions from the gesture password proving phase 74 to the gesture password graduated phase 76. Along these lines, the electronic apparatus 20 may have ascertained that (i) the user has correctly re-entered the trail gesture password a predefined number of times (e.g., correctly at least five times in a row), and (ii) the user has correctly re-entered the trail gesture password after a predefined amount of time has elapsed (e.g., correctly at least five minutes apart, 30 minutes apart, four hours apart, etc.).

At this point, the user is deemed ready to use the trial gesture password 50 to authenticate with the electronic apparatus 20. In some arrangements, the user is prompted to enter a decision on whether to (i) commit to using the trial gesture password 50 for authentication, (ii) continue with additional challenges before committing, or (iii) cancel the gesture password enrollment process 70 and revert back to using a conventional standard password.

If the user commits to using the trial gesture password 50 for authentication, the electronic apparatus 20 converts the trial gesture password 50 into an actual gesture password 50 for use in authenticating the user. Additionally, the electronic apparatus 20 may deactivate the conventional standard password and delete the conventional standard password from the electronic apparatus 20. Going forward, the electronic apparatus 20 prompts the user to correctly enter the gesture password 50 in order to access the set of protected resources 44. Additionally, the user may repeat the gesture password enrollment process 70 if the user wishes to change the original gesture password 50 to a new gesture password 50.

If the user chooses to continue with additional challenges before committing, the electronic apparatus 20 transitions back to the gesture password proving phase 74. Here, the electronic apparatus 20 continues to challenge the user to correctly enter the trial gesture password 50 over prompts at increased time intervals. The user can continue in the gesture password proving phase 74 until the user has developed enough confidence and skill to finally commit to using a gesture password 50 for authentication.

If the user chooses to cancel the gesture password enrollment process 70, the electronic apparatus 20 reinstates the convention standard password. Nevertheless, the user is free to restart the gesture password enrollment process 70 at any time.

As will now be explained in further detail, a variety of graphical passwords are suitable for use as the gesture password 50. In some arrangements, the user enters the gesture password 50 via a color-object wheel. In other arrangements, the user enters the gesture password 50 via a set of color-object menus (or palettes). In yet other arrangements, the user enters a sequence of touch screen gestures (e.g., swipes, traces, etc.) over an array of markers (e.g., a dot matrix). Other configurations are suitable for use as well. Moreover, in some arrangements, when the user initiates the gesture password enrollment process 70, the user selects a particular graphical password scheme to employ among multiple choices.

Color-Object Wheel

When the electronic apparatus 20 employs a color-object wheel, the electronic apparatus 20 displays a set of color segments on a touch screen (see the user interface 32 in FIG. 1), and renders multiple shapes within each color segment displayed on the touch screen (e.g., a wheel of colors and shapes). To acquire the trial gesture password 50 from user, the electronic apparatus 20 obtains a series of color-shape pairings in response to the user touching touch screen locations over particular shapes residing in particular color segments.

Figure 3:
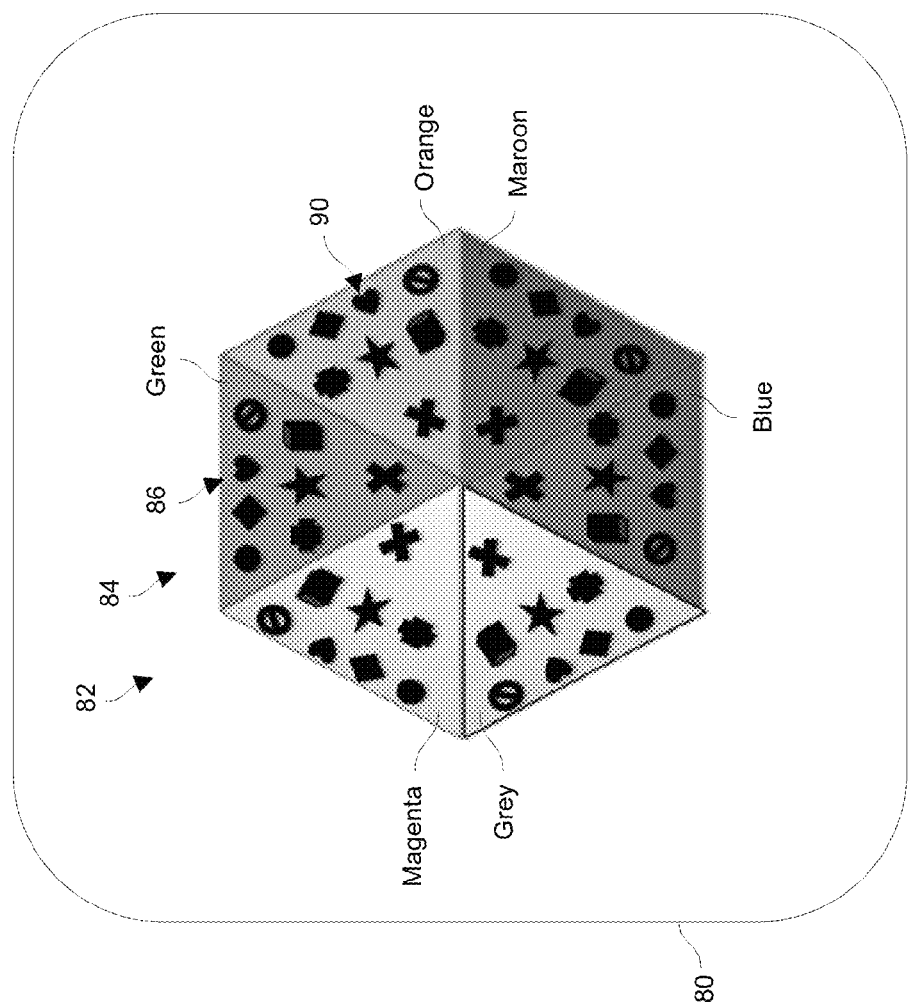
FIG. 3 is a block diagram of a color-object wheel which is suitable for prompting a user to provide, as a gesture password, multiple color-shape pairings during a first operating time.

FIG. 3 shows a view 80 that the processing circuitry 36 of the electronic apparatus 20 is capable of displaying on the user interface 32 (also see FIG. 1). The view 80 includes a color-object wheel 82 that presents a series of color segments 84 that extends from a starting point (e.g., the right side position, the bottom position, etc.) in a predefined clockwise order. By way of example only, the series of color segments 84 starting at the top position includes: a green segment, an orange segment, a maroon (or red) segment, a blue segment, a grey segment, and a magenta (or purple) segment. Other colors are suitable for use as well.

Each segment 84 of the color-object wheel 82 includes a collection of shapes (or objects) 86 (i.e., icons, symbols, patterns, etc.). Example shapes 86 include diamonds, crosses, circles, boxes, stars, hearts, moons, letters, numbers, glyphs, and so on. In some arrangements, each segment 84 includes the same collection of shapes 86. Moreover, each segment 84 may position the shapes 86 in the same locations (see FIG. 2) or in different locations. In other arrangements, the segments 84 can include different collections of shapes 86. Such various combinations and permutations provide greater unpredictability.

It should be understood that the color-object wheel 82 may include a different number of segments 84 (e.g., four, five, eight, etc.). However, the six segments 84 forming the hexagon shown in FIG. 2 enables each segment 84 (i.e., an equilateral triangle) to provide a relatively large area conducive to displaying many shapes 86 and convenient to receiving user selections.

To properly authenticate, a user is challenged to enter a sequence of color-shape pairings 90 into the electronic apparatus 20. For example, if the user interface 32 includes a touch screen, the user simply touches particular shapes 86 residing in a particular color segment 84. However, if the user interface 32 includes a display and a mouse, the user may move the mouse (or other pointer) over a particular shape 86 residing in a particular color segment 84 and then click the mouse to select the particular shape 86 in the particular color segment 84. Other methodologies are suitable for use as well. Accordingly, to select a pairing of orange-heart, the user selects the heart in the orange color segment 84 (see arrow 90 in FIG. 2).

A suitable authentication code is a user-entered set which contains multiple color-shape pairings 90. The user can simply touch a particular object 86 in a particular color segment 84 to enter a color-shape pairing 90. The user then repeats this action to enter a second color-shape pairing 90, and again to enter a third color-shape pairing 90, and so on. The strength of the authentication code increases with the number of color-shape pairings 90 in the user-entered set (e.g., at least three pairings 90, four, five, six, seven, eight, etc.). For example, a suitable authentication code having a series of six color-shape pairings 90 can be as follows: orange-heart, magenta-star, magenta-circle, green-star, maroon-circle, grey-diamond.

The electronic apparatus 20 then uses the authentication code for authentication. In some arrangements, the electronic apparatus 20 takes the entered color-shape pairings 90 as inputs to a key derivation function and generates a key which is used for access control. For example, a controller formed by the processing circuitry 36 executing the application 42 (FIG. 1) can derive, as an access control result, a cryptographic key from a series of color-shape pairings 90 obtained in response to the user touching touch screen locations over the particular shapes residing in the particular color segments. The key is configured to unlock access to the set of protected resources 44. Along these lines, the key can be used to decrypt a collection of tokens where each token is configured to unlock access to a respective protected resource 44. In some situations, the protected resource 44 is an app which is capable of remotely accessing another application, content, or data from an external device through the network interface 30.

In other arrangements, the electronic apparatus 20 matches the user-entered set of color-shape pairings 90 with an expected set of color-shape pairings 90. Authentication is successful when the user-entered set of color-shape pairings 90 matches the expected set of color-shape pairings 90.

In some arrangements, the user may select the color-shape pairings 90 in any order. In other arrangements, the user must select the color-shape pairings 90 in a precise order, i.e., the authentication code is order dependent.

If user authentication is successful, the electronic apparatus 20 allows the user to access the protected resources 44. For example, a generated cryptographic key can be used to unlock other cryptographic keys and resources, tokens, files, etc. However, if user authentication is unsuccessful, the electronic apparatus 20 denies access to the protected resources 44. Of course, a remedial activity may take place such as sending a warning to an administrator, providing the user with another opportunity to authenticate, step-up authentication, locking out the user after a predefined number of unsuccessful authentication attempts, and so on.

Figure 4:
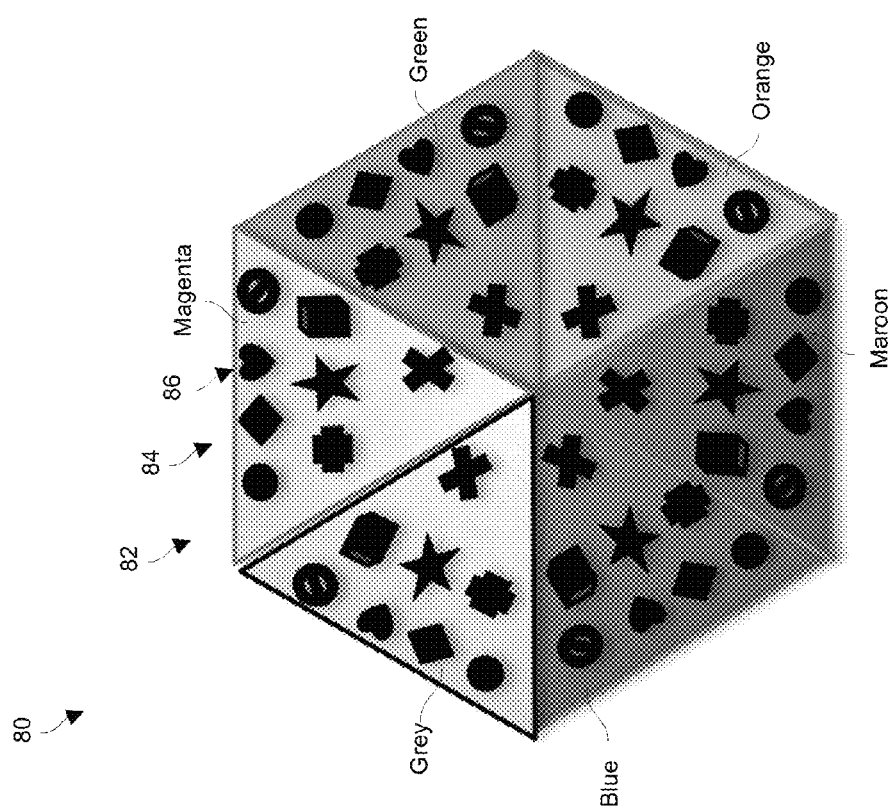
FIG. 4 is a block diagram of the color-object wheel during a second operating time.
Figure 5:
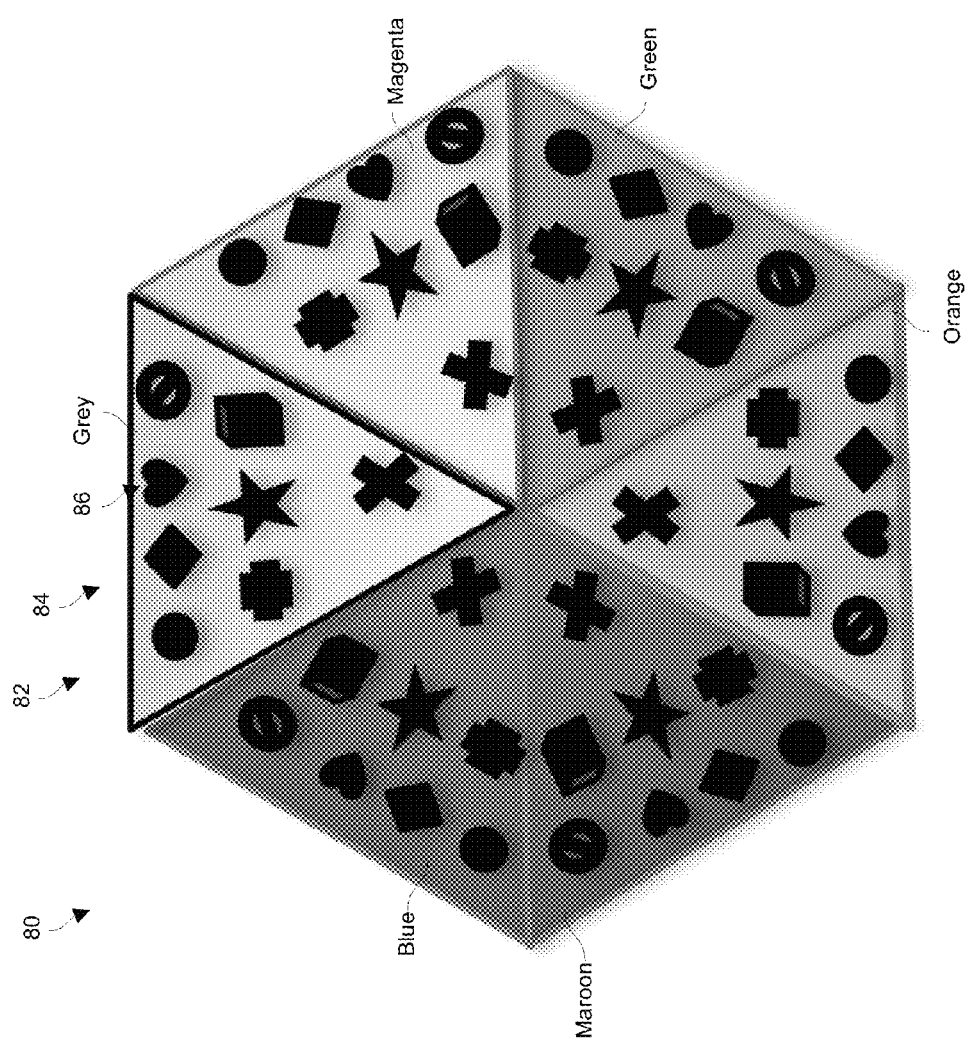
FIG. 5 is a block diagram of the color-object wheel during a third operating time.

In some arrangements, the color-object wheel 82 changes orientation (e.g., rotates in increments such as multiples of 60 degrees when there are six segments 84) during different authentication attempts. For example, FIGS. 3 through 5 show different orientations for the color-object wheel 82 during subsequent authentication attempts. By way of example, the color-object wheel 82 is rotates clockwise by 60 degrees during each successive authentication attempt.

As shown in FIG. 4, the view 80 of the color-object wheel 82 is rotated clockwise by 60 degrees from the view 80 in FIG. 3. That is, FIG. 4 shows the color-object wheel 82 during an authentication attempt following the one associated with FIG. 3. In FIG. 4, the color segments 84 have shifted so that all of the color segments 84 are still visible to the user. Moreover, each color segment 84 includes multiple objects 86 which are available for selection.

Figure 6:
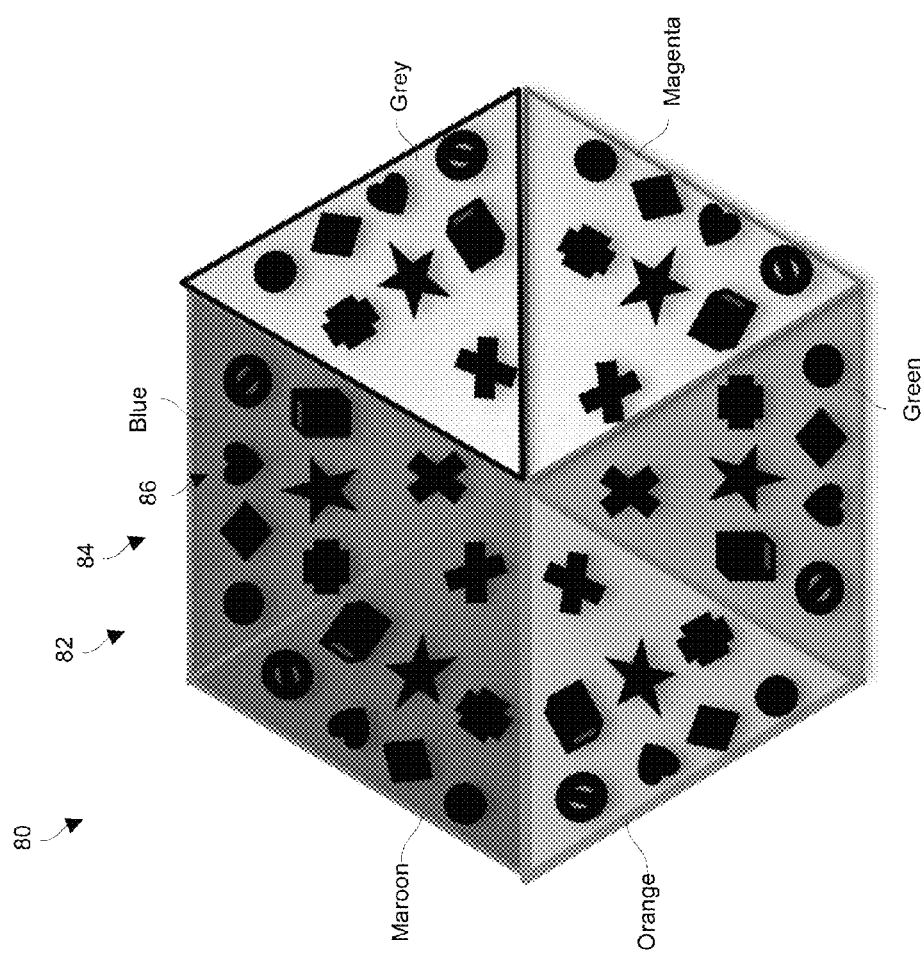
FIG. 6 is a block diagram of the color-object wheel during a fourth operating time.

Since the user has to touch different screen locations on the color-object wheel 82 of FIG. 4 in order to enter the same series of color-shape pairs 50 vis-à-vis the color-object wheel 82 of FIG. 3, the user cannot rely on smudges on a touch screen. Likewise, FIG. 5 shows the color-object wheel 82 during an authentication attempt following the one associated with FIG. 4, FIG. 6 shows the color-object wheel 82 during an authentication attempt following the one associated with FIG. 5, and so on.

It should be understood that the user is challenged to enter, as the gesture password 50, the proper authentication code (i.e., a correct series of color-shape pairings 90) regardless of the current orientation of the color-object wheel 82. Moreover, in some arrangements, the shapes and/or shape locations can change from one authentication attempt to another. Such operation makes the challenge independent of the same screen coordinates, smudges on a touch screen, and so on.

In some arrangements, the color-object wheel 82 rotates in the counterclockwise direction between authentication attempts. In some arrangements, the color-object wheel 82 rotates more than 60 degrees between authentication attempts (e.g., 120 degrees, 180 degrees, etc.). In some arrangements, the color segments 84 change position randomly between authentication attempts thus strengthening security (e.g., clockwise then counterclockwise). For example, the color segments 84 can be randomly shuffled, reversed/flipped, etc. so that the color order changes for each authentication attempt.

It should be understood that, to teach the user how to enter the gesture password 50, the electronic apparatus 20 plays a motion video to the user. In particular, the electronic apparatus 20 displays the color-object wheel 82 on the user interface 32 (e.g., a touch screen, also see FIG. 1) and highlights a series of color-shape pairings 90. Along these lines, an ordered sequence of color-shape pairings 90 within the color-object wheel 82 can brighten (e.g., flash, glow, change color, etc.) to indicate selection of each color-shape pairing 90. Text, audio, etc. can instruct the user to touch various color-shape pairings 90 to create and enter the gesture password 50.

In some arrangements, each electronic apparatus 20 plays a different motion video with a different series of color-shape pairings 90. Accordingly, even if the user simply touches the brightened color-shape pairings 90 of the color-object wheel 82 in the same order, the user will be enter a suitable gesture password 50 that is different than other gesture passwords 50 used by other electronic apparatus 20. Further details will now be provided with reference to FIG. 7.

Color-Object Menus

When the electronic apparatus 20 employs a set of color-object menus (or palettes), the electronic apparatus 20 renders (i) a color palette on the user interface 32 (FIG. 1), the color palette including multiple selectable colors, and (ii) a shape menu on the user interface 32, the shape menu including multiple selectable shapes. To acquire the trial gesture password 50 from user, the electronic apparatus 20 obtains a series of color-shape pairings 90 in response to the user providing drag and drop gestures over screen locations to associate particular colors with particular shapes.

Figure 7:
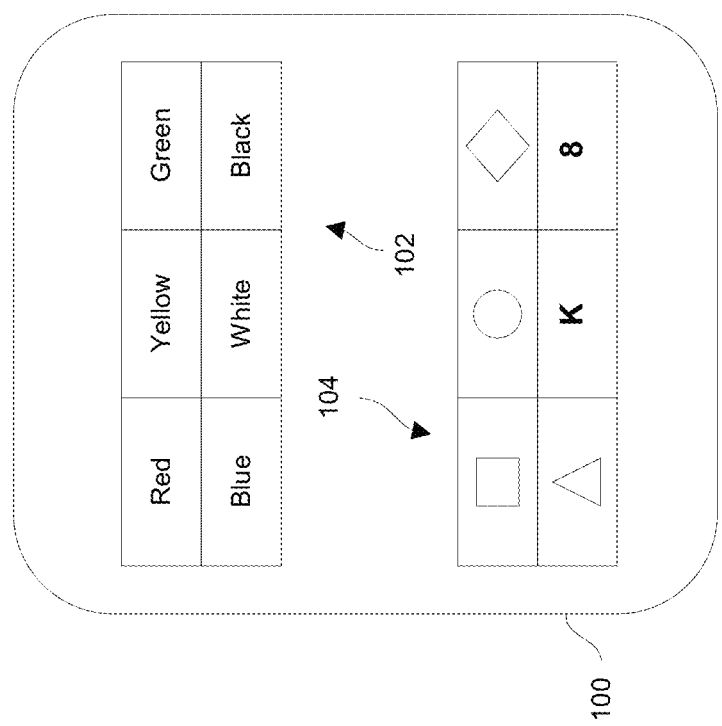
FIG. 7 is a block diagram of an interface having a set of color-object menus which is an alternative to the color-object wheel of FIGS. 3 through 6.

FIG. 7 shows a view 100 that can be displayed on the user interface 32 of the electronic apparatus 20 (also see FIG. 1). The view 100 includes a color menu 102 and a shape (or object) menu 104. The color menu 102 offers the user a variety of color selections. The shape menu 104 offers the user a variety of shape selections.

Although FIG. 7 illustrates various colors using words, it should be understood that the view 100 can simply include the color itself, or even the color and the word. Likewise, the various shape selections can be outlined, solids, shaded or patterned, and so on.

Using the view 100, the user provides a series of user gestures (e.g., finger swipes, stylus/pen strokes, mouse movements, etc.). In particular, the user can drag and drop a color selection onto a shape selection. For example, in the context of a touch screen, touching and dragging the green cell of the color palette 102 over the diamond of the shape menu 104 enters the color-shape pair "green-diamond".

Alternatively, the user can drag and drop a shape selection onto a color selection. For example, touching and dragging the circle cell of the shape menu 104 over the black cell of the color palette 102 enters the color-shape pair "black-circle".

In some arrangements, the electronic apparatus 20 draws a distinction between whether a color is dragged on to a shape, or whether a shape is dragged on to a color. For example, a user input based on dragging the color green over the diamond to enter "green-diamond" is different than another user input based on based on dragging the diamond over the color green to enter "diamond-green". That is, such direction-based gestures are considered to be different thus increasing the number of possible selections for a user (i.e., unpredictability).

The end result is a series of user-entered color-shape pairings 90 that can be used as input to a key derivation function to generate a key, or that can be compared to an expected set of color-shape pairings 90. Such a view 100 is well suited for a touch screen in which the user enters a sequence of swiping motions. Nevertheless, other user interfaces are suitable as well (e.g., touch pads, mice, trackballs, etc.).

It should be understood that the positions of the colors can change within the color menu 102 between different authentication attempts. Similarly, the positions of the shapes can change within the shape menu 104 between different authentication attempts. In some arrangements, the changes are randomized (e.g., shuffled) to strengthen security.

It should be understood that, to demonstrate to the user how to enter the gesture password 50, the electronic apparatus 20 plays a motion video to the user. In particular, the electronic apparatus 20 displays the color-object menus 102, 104 on the user interface 32 (e.g., a touch screen, also see FIG. 1) and highlights a series of swiping paths or tracing paths leading from one menu 102, 104 to the other menu 104, 102 (or in the opposite direction). That is, an ordered sequence of brightened paths can be displayed from one menu 102, 104 to the other 104, 102 incrementally to indicate selection of each color-shape pairing 90. Text, audio, etc. can instruct the user to incrementally mimic or incrementally provide traces similar to the brightened paths to create and enter the gesture password 50.

In some arrangements, each electronic apparatus 20 plays a different motion video with a different series of color-shape pairings 90. Accordingly, even if the user simply copies or traces over the brightened paths, the user will be able to enter a suitable gesture password 50 that is different than other gesture passwords 50 used by other electronic apparatus 20. Further details will now be provided with reference to FIG. 8.

Array of Markers

When the electronic apparatus 20 employs an array of markers, the electronic apparatus 20 displays a layout of markers (e.g., dots, shapes, other graphics/objects, etc.) on the user interface 32 (FIG. 1). To acquire the trial gesture password 50 from user, the electronic apparatus 20 obtains a series of user gestures in response to the user moving a finger relative to the array of markers (e.g., finger swipes, finger traces from one screen location to another screen location, etc.).

Figure 8:
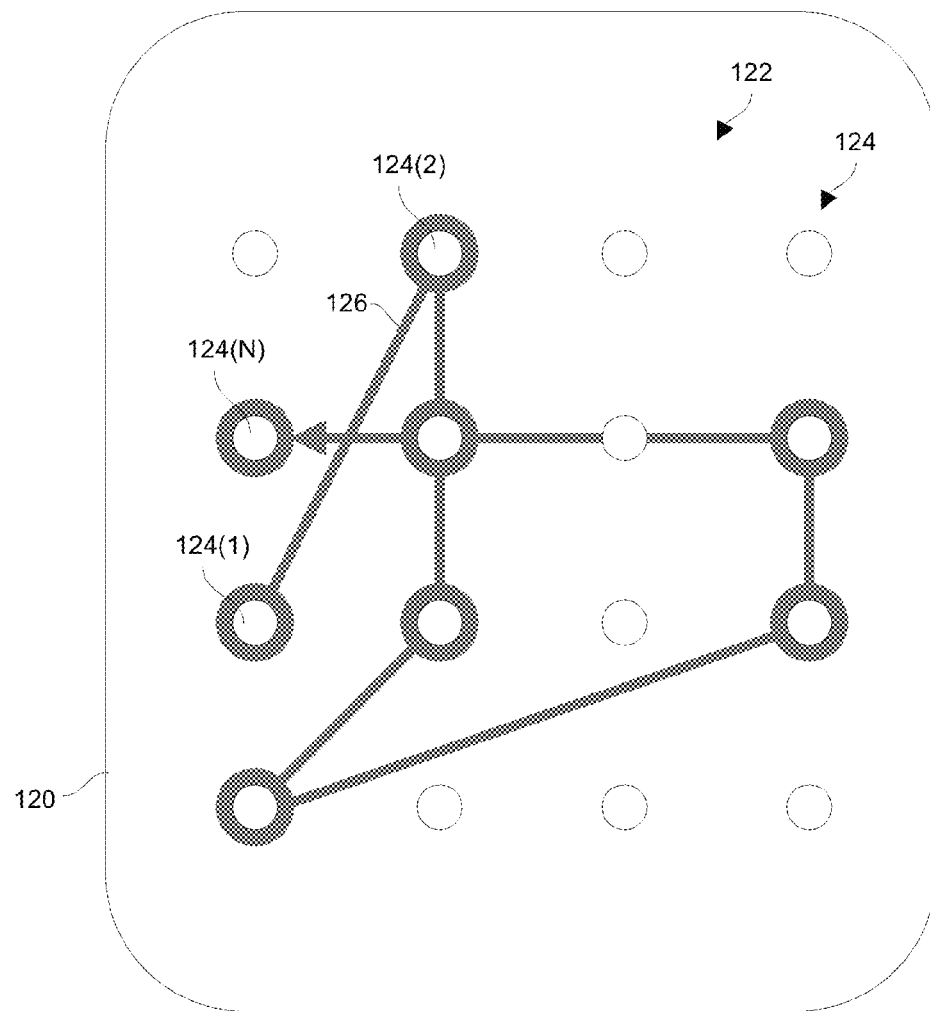
FIG. 8 is a block diagram of an interface having an array of markers which is an alternative to the color-object wheel of FIGS. 3 through 6 and to the interface of FIG. 7.

FIG. 8 shows a view 120 that can be displayed on the user interface 32 of the electronic apparatus 20 (also see FIG. 1). The view 120 includes an array 122 of markers 124 over which the user navigates using user gestures. By way of example, the array 122 is a 4×4 matrix of dots. Other layouts are suitable as well (e.g., 3×3, 5×5, irregular patterns, etc.). Additionally, other marker types are suitable as well (e.g., triangles, squares, stars, vehicle shapes, moon shapes, letters, numbers, text, symbols, mixtures of different shapes, etc.).

Using the view 120, the user provides a series of user gestures (e.g., finger swipes, stylus/pen strokes, mouse movements, etc.). In the context of a touch screen, the user touches a first marker 124(A) on the touch screen with a finger, then drags the finger to a second marker 124(B), and so on, until the user reaches the last marker 124(N), and then removes the finger from contact with the touch screen. While the user drags the finger over the touch screen, the user is careful to purposely touch markers 124 that form the user's gesture password 50 but does not touch other markers 124. Once the user removes the finger from the touch screen, the electronic apparatus 20 considers the gesture password 50 entered and evaluates the gesture password 50.

In some arrangements, the markers 124 and the traced path 126 (i.e., the contacted portions of the touch screen) remain highlighted after the user contacts those touch screen areas. Accordingly, the user essentially draws a pattern on the touch screen while entering the gesture password 50.

It should be understood that in the context of a user interface 32 that is not a touch screen, similar effects and results can be obtained via other mechanisms. For example, the user can trace over a touch pad, the user can move a mouse while holding down a mouse button, the user can operate a trackball, and so on.

The end result is an entered sequence of markers 124 that can be used as input to a key derivation function to generate a key, or that can be compared to an expected ordered sequence of markers 124. In some arrangements, the gesture password 50 must include at least a minimum number of markers 124 (e.g., six, eight, ten, etc.) and, if the user inadvertently lifts the finger from the touch screen prematurely (i.e., before reaching the last marker 124), the user must start over.

To teach the user how to enter a gesture password 50, the electronic apparatus 20 plays a motion video to the user. In particular, the electronic apparatus 20 incrementally displays a highlighted pattern over the array 122 of markers 124 similar to that shown in FIG. 8. Text, audio, etc. can instruct the user to mimic or provide traces similar to the highlighted pattern to create and enter the gesture password 50.

In some arrangements, each electronic apparatus 20 plays a different motion video with a different highlighted pattern. Accordingly, even if the user simply copies or traces over the highlighted pattern as it is incrementally presented, the user will be able to enter a suitable gesture password 50 that is different than other gesture passwords 50 used by other electronic apparatus 20. Further details will now be provided with reference to FIG. 9.

Further Details

Figure 9:
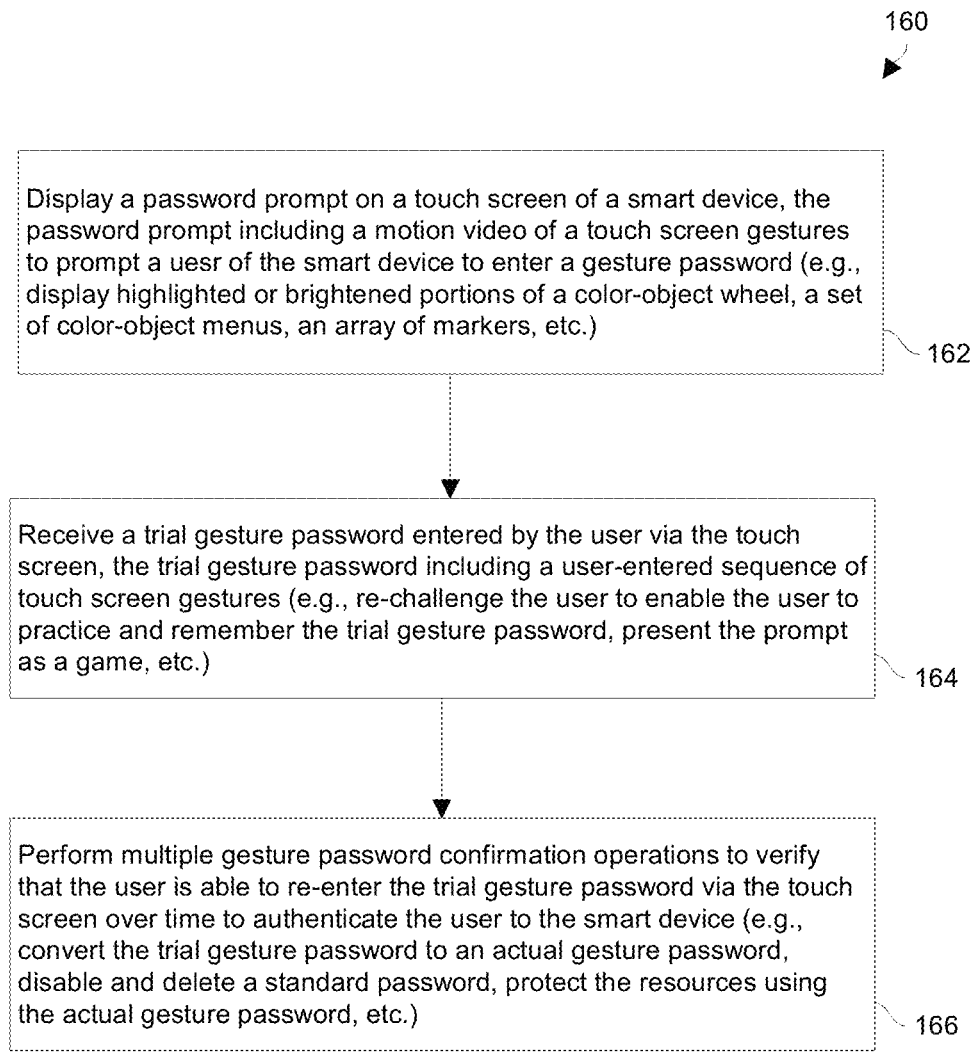
FIG. 9 shows a flowchart of an authentication enrollment procedure which is capable of being performed by the electronic apparatus of FIG. 1.

FIG. 9 is a flowchart of a procedure 160 that is performed by a smart device (e.g., see the electronic apparatus 20 in FIG. 1) to provide user authentication. In particular, the procedure 160 enables a user to establish a trial gesture password 50, practice entering the trial gesture password 50, pass preset criteria to demonstrate the user's ability to reliably recall and enter the trial gesture password 50, and then convert the trial gesture password 50 to an actual gesture password 50 for use in authentication.

At 162, the smart device displays a password prompt on a touch screen of the smart device. The password prompt includes a graphic (e.g., a color-object wheel, a set of color-object menus, an array of markers, etc.) and a motion video of touch screen gestures (e.g., brightened or highlighted objects or paths, etc.) to prompt the user of the smart device to enter a gesture password 50. In some arrangements, the smart device generates a random gesture password dynamically (e.g., on the fly in response to the user entering a command), and graphically renders the random gesture password on the touch screen.

At 164, the smart device receives a trial gesture password 50 entered by the user via the touch screen. The trial gesture password 50 includes a user-entered sequence of touch screen gestures which identify particular password components (e.g., a sequence of color-shape pairings 90, a series of selected markers 124, etc.). During 164, the user may practice re-entering the trial gesture password 50 as many times as desired. In some situations, the smart device presents the password prompt as a game and lets the user enjoy developing skills in remembering and entering the gesture password 50 while playing the game. For example, the smart device re-prompts the user to enter the trial gesture password 50 and outputs assessments such as an accuracy score indicating whether the user correctly entered the gesture password 50, a predictability score indicating how easy the gesture password 50 is to guess, and so on.

At 166, the smart device performs multiple gesture password confirmation operations to verify that the user is able to re-enter the trial gesture password 50 via the touch screen over time to authenticate the user to the smart device. In particular, the smart device can employ a counter to track how many times in a row the user correctly enters the trial gesture password 50. Additionally, the smart device can extend the time period between password prompts to confirm that the user remembers the trial gesture password 50. That is, the smart device continues to challenge the user to properly enter the trial gesture password 50. Only after the user correctly enters the trial gesture password 50 a predefined number of times in a row (e.g., five times, six times, etc.) over the course of ever increasing time intervals (e.g., after five minutes, after 15 minutes, etc.), does the smart device consider the user to have passed, i.e., graduated.

Once the user has satisfied a predefined set of criteria and commanded the smart device to begin using the trial gesture password 50 for authentication, the smart device converts the trial gesture password 50 into an actual gesture password 50 for use in authentication. For example, the user may has satisfied the predefined set of criteria by correctly re-entering the trail gesture password 50 a predefined number of times over ever increasing time intervals.

To migrate from using a conventional standard password to the gesture password 50, the smart device can unlock access to the set of protected resources 44 using a standard password cryptographic key derived from the standard password, and then lock access to the set of protected resources 44 using the gesture password cryptographic key. Since the set of protected resources 44 is now secured by the gesture password 50, the smart device can then delete the standard password cryptographic key.

It should be understood that the user can optionally enter a cancellation command to indicate that the user no longer wishes to switch to using the trial gesture password to authenticate. In this situation, as long as the user has not yet committed to the gesture password 50 and as long as the standard password mechanism has not been deleted, the smart device can re-instate use of the standard password cryptographic key to unlock access to the set of protected resources 44.

Figure 10:
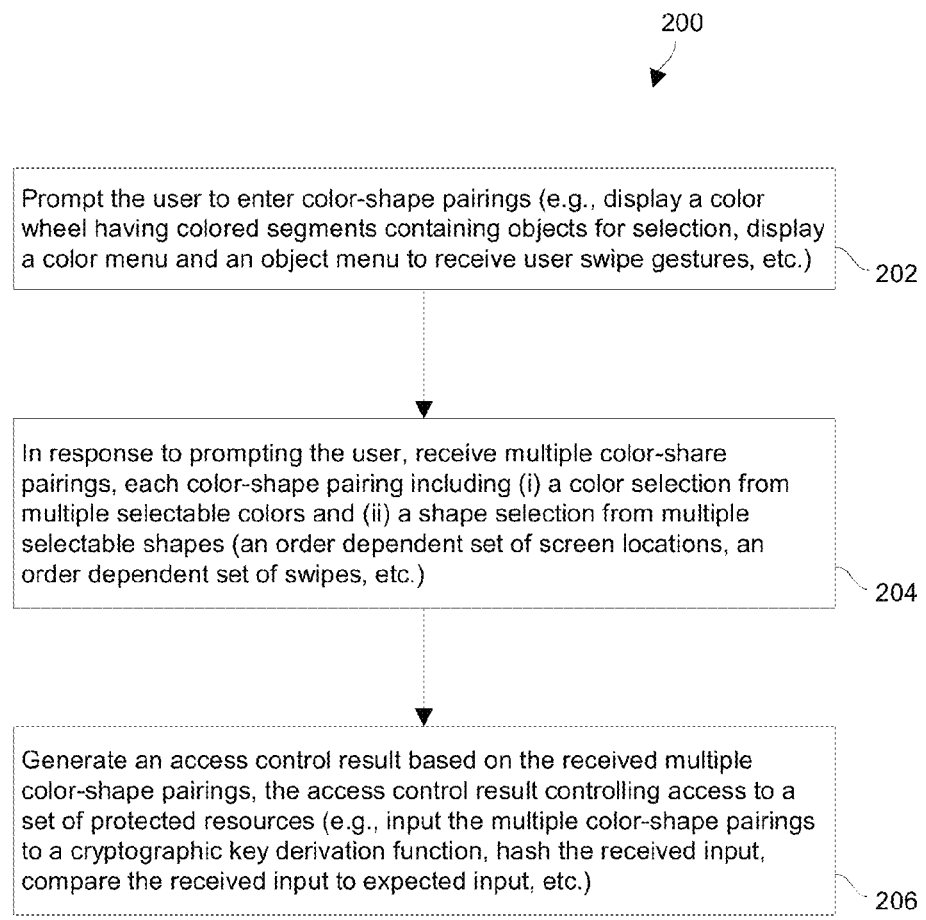
FIG. 10 shows a flowchart of an access control procedure which is capable of being performed by the electronic apparatus of FIG. 1.

FIG. 10 is a flowchart of a procedure 200 that is performed by the electronic apparatus 20 to generate a key. By way of example, the electronic apparatus 20 is described as generating the key from a sequence of color-shape pairings. In other arrangements, the electronic apparatus 20 generates the key from other input such as a series of selected markers 124, and so on.

At 202, the electronic apparatus 20 prompts the user to enter multiple color-shape pairings. In some arrangements, the electronic apparatus 20 displays a color-object wheel (see FIG. 3). In other arrangements, the electronic apparatus 20 displays menus (see FIG. 7). Other display configurations are suitable for use as well.

At 204, the electronic apparatus 20, receives multiple color-shape pairings in response to prompting the user. In particular, a user operates a user interface (FIG. 1) to select a color and a shape for each color-shape pairing (also see FIGS. 3-7). Each color-shape pairing includes (i) a color selection from multiple selectable colors and (ii) a shape selection from multiple selectable shapes.

In some arrangements, the shape within the color may have a different color than the background color. For example, the shape color may be black, but the background color may be orange. In such arrangements, the particular background color is the color that is considered selected by the user.

At 206, the electronic apparatus 20 generates an access control result based on the received multiple color-shape pairings, the access control result controlling access to a set of protected resources. The access control result determines whether the user is granted or denied access to a set of resources.

In some arrangements, the electronic apparatus 20 can provide the multiple color-shape pairings as inputs to a key derivation function to create a key (e.g., with order dependency). In some arrangements, key generation is dependent on the order of the multiple color-shape pairings. In some arrangements, the key derivation function takes additional inputs (e.g., stable values of other parameters from the electronic apparatus 20 such as serial number data, component identifiers, module IDs, etc.) as well. In some arrangements, access control involves decrypting a bag of tokens or other keys, file decryption, certificate generation, for login access, for application access, for secure communications, and so on.

In other arrangements, the electronic apparatus 20 compares the entered multiple color-shape pairings to expected multiple color-shape pairings. The expected multiple color-shape pairings can be programmed into the electronic apparatus 20 during an enrollment process. This comparison may be performed locally within the electronic apparatus 20 or involve communication with an external device such as an external authentication server. In these arrangements, the access control result has (i) a first value indicating that user authentication is successful when the entered multiple color-shape pairings match the expected multiple color-shape pairings and (ii) a second value indicating that user authentication is unsuccessful when the entered multiple color-shape pairings do not match the expected multiple color-shape pairings. The second value is different than the first value. Further details will now be provided with reference to FIG. 11.

Figure 11:
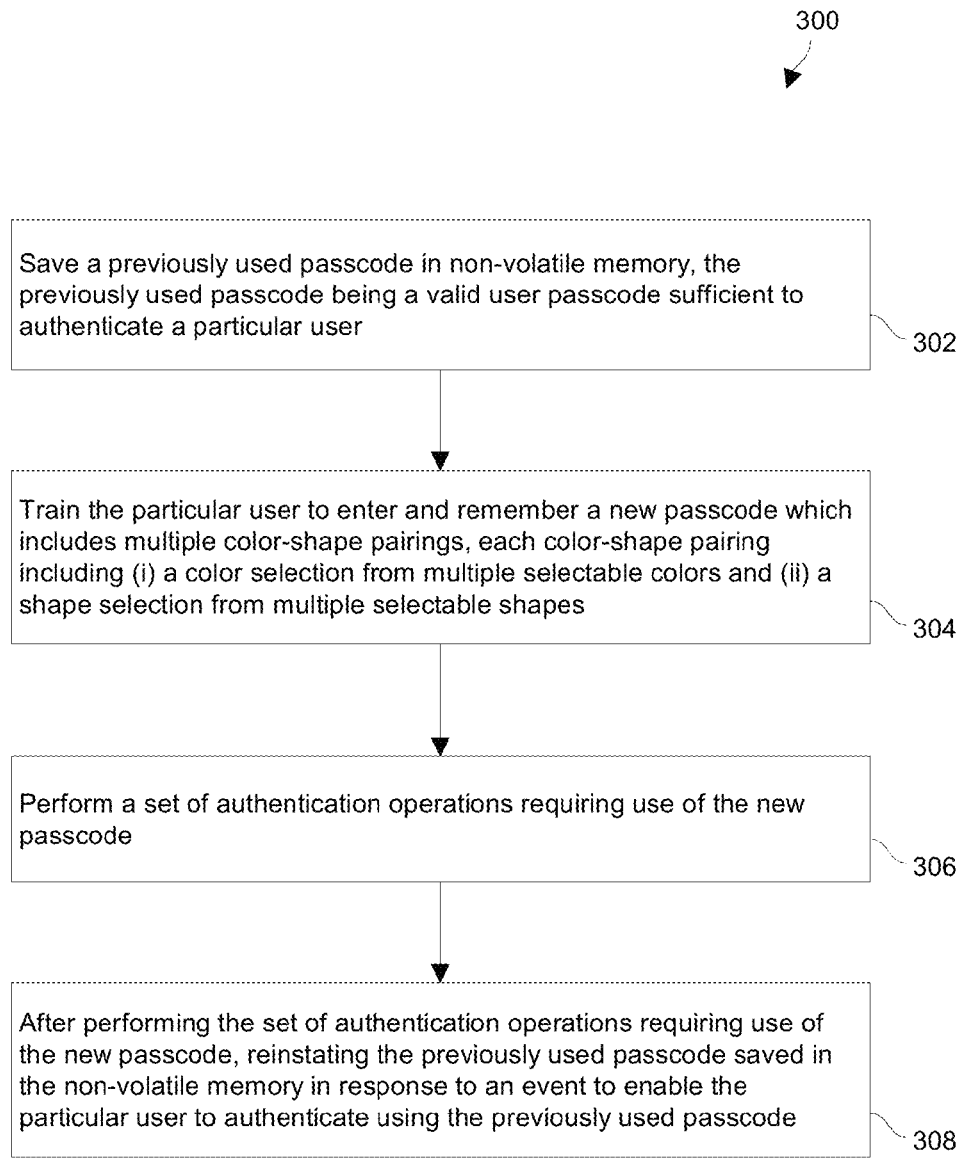
FIG. 11 shows a flowchart of another procedure which is capable of being performed by the electronic apparatus of FIG. 1.

FIG. 11 is a flowchart of a procedure 300 that is performed by the electronic apparatus 20 to authenticate a user. The procedure 300 is suitable for use by the electronic apparatus 20 if the user finds it difficult to migrate from a previously used authentication process to a new authentication process that uses multiple color-shape pairings.

At 302, the electronic apparatus 20 saves a previously used passcode in memory. The previously used passcode is a valid user passcode that is sufficient to authenticate a particular user.

At 304, the electronic apparatus 20 trains the particular user to enter and remember a new passcode that includes multiple color-shape pairings. Each color-shape pairing includes (i) a color selection from multiple selectable colors and (ii) a shape selection from multiple selectable shapes.

At 306, the electronic apparatus 20 performs a set of authentication operations requiring use of the new passcode.

At 308, electronic apparatus 20, after performing the set of authentication operations requiring use of the new passcode, reinstates the previously used passcode saved in the memory in response to an event (e.g., an override command, a certain number of failed attempts within a given amount of time after migrating to the new process, etc.) to enable the particular user to authenticate using the previously used passcode.

In some arrangements, the electronic apparatus 20 offers the user the opportunity to select a variety of different color-shape prompting configurations. For example, the user is able to choose between the view 80 (e.g., the wheel-based view of FIG. 3) and the view 100 (e.g., the menu-based view of FIG. 7), perhaps among other views (e.g., the array of markers of FIG. 8). Such customization ability enables the user to select a particular view that enables the user to easily authenticate (i.e., which is less burdensome to remember the series of color-shape pairings), but nevertheless provides stronger security than that of a conventional PIN or password.

As described above, improved techniques are directed to authentication and access control techniques which involve the use of gesture passwords 50. Such use of gesture passwords 50 is capable of providing greater unpredictability than that provided by a routine PIN (or a normal password). Moreover, depending on how an interface is presented to the users, the interfaces may easily enable the users to learn and remember the gesture passwords 50 to generate substantially higher entropy than that available from conventional PINs. For example, multiple color-shape pairings 90 or markers 124, in combination with a healthy set of device stable values, can offer at least 128 bits for generation of an effective cryptographic key.

To improve a user's ability to recall and enter a gesture password 50, an electronic apparatus can put a user through an enrollment process 70 having multiple phases 72, 74, 76. First, the electronic apparatus plays a training video and allows the user to practice entering a gesture passwords (e.g., a training phase 72). Additionally, the electronic apparatus confirms that the user is able to competently re-enter their gesture passwords over time (e.g., a proving phase 74) before graduating the user so that the user thereafter uses a gesture password 50 to authenticate (e.g., a graduated phase 76). Such operation enables a user to opt out or revert back to a standard password mechanism (e.g., conventional PINs) if the user decides that gesture password authentication is too difficult or demanding. However, a user that continues and eventually completes the enrollment process 70 is able to effectively and reliably remember and enter a gesture password 50 which provides high entropy and thus relatively strong security.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components that were described above such as an authentication server or protected resource servers are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that, on a conventional mobile platform, many times authentication is bound to key generation. Unfortunately, data entry on mobile devices is challenging so most vendors are using conventional PINs as a password to derive a key. Therefore, most keys generated of those mobile devices have very low entropy (ranging 10-17 bits).

Even if it is assumed that some device stable values are available for use to generate a key, there still exists a need of between 40-60 bits of entropy to make an effective key (e.g., for a total of 128 bits). Accordingly, the above-described color-shape pairings 90 offer the ability to obtain higher entropy.

In particular embodiment, it should be understood that the electronic apparatus 20 can display a hexagon comprised of six triangles of different colors. On each of these colored triangles, the electronic apparatus 20 cab display six to eight shapes depending on screen resolution and size. Such shapes can be randomly positioned on each triangle. Additionally such shapes can come from a known pool, but not all colored triangles are required to have the same shapes.

In some arrangements, the relations of colors on the hexagon are fixed, but the initial angular displacement of the hexagon is random. For a user to authenticate, he/she will have to select eight shapes from any of the hexagons. For example, red-heart, maroon-X, orange-circle, etc. While the shapes are of different color, most humans will recall them as such and therefore will keep twice the entropy of a normal password.

It should be further understood that a variety of enrollment processes are available. To be able to recall the above-described method in an effective way, the following enrollment process is offered:

1. Present a video of an authentication process for selecting the different color-shape pairings. The video presents different random shapes and different selection patterns as since it can be assumed that most users will copy the behavior in the video.
2. Ask the user to select a password (e.g., a sequence of color-shape pairings). Here, the user can select a password at random, authenticate for the first time, authenticate again, be informed that the user will be prompted several times in the future to re-enter the password, and so on.
3. Ask the user to confirm the password at least three times in gaps increasing in time (e.g., from 1 sec to 40 seconds).
4. Confirm registration, but still keep a reset option in memory (e.g., store the user's previous password).
5. Pop up an authentication request after a predefined amount of time later (e.g., five minutes) with the option to skip or reset if the user fails.
6. After the predefined amount of time has elapsed without the user canceling enrollment, the password is set and a key is generated from it.

In connection with step 2 above, in some arrangements, the circuitry carrying out the enrollment process avoids accepting "weak" password choices from the user. Along these lines, the circuitry can compare the user-provided color-share pairings against a set of tables such as one table of weak individual pairings and another table of weak overall passwords. Some obviously bad overall passwords include associating the same color with each of the different shapes (e.g., since my favorite color is blue, I'll just pick blue and various shapes), or vice-versa (e.g., just picking one shape to repeatedly pair with the same color).

One should appreciate that there may be a fair degree of subtlety here since the guessing entropy of various choices is unclear. When it comes to the weak individual pairings, some shapes (red hearts, green clovers) may have a greater-than-random chance of association with a particular color.

Additionally, it should be understood that various components such as the electronic apparatus 20 or an external authentication server that operates with the electronic apparatus 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the above-described authentication techniques that use color-shape pairings may be combined with other authentication processes for richer and stronger authentication. For example, the color-shape pairings can serve as another authentication factor in multi-factor authentication. Additionally, such color-shape pairings may be combined with biometric authentication (e.g., user gestures, swiping rates, etc.). Furthermore, such color-shape pairings may be used in adaptive authentication, and so on.

Also, it should be understood that the above-described techniques can be configured for use by the visually impaired. Along these lines, if the user is color blind, the color segments can be adapted to include segment identifiers (e.g., numbers, letters, labels, names, shading, etc.) or other identification schemes to enable the user to distinguish the color segments from each other. Such modifications and enhancements are intended to belong to various embodiments of the disclosure.

What is claimed is:

1. In a smart device, a method of providing user authentication, the method comprising:
   displaying, by processing circuitry of the smart device, a password prompt on a touch screen of the smart device, the password prompt including a motion video of touch screen gestures to prompt a user of the smart device to enter a gesture password;
   receiving, by the processing circuitry, a trial gesture password entered by the user via the touch screen, the trial gesture password including a user-entered sequence of touch screen gestures; and
   performing, by the processing circuitry, multiple gesture password confirmation operations to verify that the user is able to re-enter the trial gesture password via the touch screen over time to authenticate the user to the smart device;
   wherein displaying the password prompt on the touch screen of the smart device includes:
   generating, by the processing circuitry, a random gesture password which includes a random sequence of touch screen gestures, and
   outputting, by the processing circuitry, the random gesture password on the touch screen, the random gesture password including the random sequence of touch screen gestures to enable the user to securely use the random sequence of touch screen gestures as the trial gesture password;
   wherein performing the multiple gesture password confirmation operations includes:
   re-prompting the user to enter the trial gesture password via the touch screen,
   in response to re-prompting the user to enter the trial gesture password, acquiring user input as the user attempts to re-enter the trial gesture password via the touch screen in response to re-prompting, and
   based on the user input, assessing ability of the user to re-enter the trial gesture password;
   wherein assessing the ability of the user to re-enter the gesture password includes:
   detecting a graduation event in which the user satisfies a set of gesture password entrance criteria, and
   converting the trial gesture password into an actual gesture password of the user in response to detection of the graduation event.

2. A method as in claim 1 wherein receiving the trial gesture password entered by the user via the touch screen includes:
   re-playing the random sequence of touch screen gestures on the touch screen, and
   sampling the trial gesture password from the touch screen over multiple iterations to train the user to enter the trial gesture password.

3. A method as in claim 1 wherein detecting the graduation event in which the user satisfies the set of gesture password entrance criteria includes:
   ascertaining that (i) the user has correctly re-entered the trial gesture password a predefined number of times, and (ii) the user has correctly re-entered the trial gesture password after a predefined amount of time has elapsed.

4. A method as in claim 1 wherein converting the trial gesture password into the actual gesture password of the user includes:
   generating a gesture password cryptographic key based on the actual gesture password, and after the gesture password cryptographic key is generated, imposing a need for the gesture password cryptographic key to access a set of protected resources.

5. A method as in claim 4 wherein, prior to displaying the password prompt on the touch screen of the smart device, the smart device temporarily saves a standard password cryptographic key used to unlock access to the set of protected resources, and wherein imposing the need for the gesture password cryptographic key to access the set of protected resources includes:
   unlocking access to the set of protected resources using the standard password cryptographic key,
   locking access to the set of protected resources using the gesture password cryptographic key, and
   deleting the standard password cryptographic key from the smart device.

6. A method as in claim 1 wherein, prior to displaying the password prompt on the touch screen of the smart device, the smart device temporarily saves a standard password cryptographic key used to unlock access to a set of protected resources, and wherein the method further comprises:
   receiving a cancellation command from the user, the cancellation command indicating that the user no longer wishes to switch to using the trial gesture password to authenticate, and
   in response to the cancellation command, re-instating use of the standard password cryptographic key to unlock access to the set of protected resources.

7. A method as in claim 1 wherein displaying the password prompt includes displaying a set of color segments on the touch screen, and rendering multiple shapes within each color segment displayed on the touch screen; and wherein receiving the trial gesture password includes:
   obtaining a series of color-shape pairings in response to the user touching touch screen locations over particular shapes residing in particular color segments.

8. A method as in claim 1 wherein displaying the password prompt includes (i) rendering a color palette on the touch screen, the color palette including multiple selectable colors, and (ii) rendering a shape menu on the touch screen, the shape menu including multiple selectable shapes; and wherein receiving the trial gesture password includes:
   obtaining a series of color-shape pairings in response to the user providing drag and drop gestures over touch screen locations to associate particular colors with particular shapes.

9. A method as in claim 1 wherein displaying the password prompt includes rendering an array of markers on the touch screen; and wherein receiving the trial gesture password includes:
   obtaining a series of user gestures in response to the user moving a finger relative to the array of markers.

10. A method as in claim 1 wherein performing the multiple password confirmation operations further includes:
   imposing a requirement that the user correctly enter the trial gesture password multiple times in a row during a trial time period before allowing the user to commit to using the trial gesture password for protected resource access control.

11. A method as in claim 10 wherein imposing the requirement includes:
   increasing an amount of time in the trial time period in response to an extend time period command provided by the user.

12. A smart device, comprising:
   a touch screen;
   memory; and
   control circuitry coupled to the touch screen and the memory, the memory storing instructions which, when carried out by the control circuitry, cause the control circuitry to:
      display a password prompt on the touch screen, the password prompt including a motion video of touch screen gestures to prompt a user of the smart device to enter a gesture password,
      receive a trial gesture password entered by the user via the touch screen, the trial gesture password including a user-entered sequence of touch screen gestures, and
      perform multiple gesture password confirmation operations to verify that the user is able to re-enter the trial gesture password via the touch screen over time to authenticate the user to the smart device;
   wherein the control circuitry, when displaying the password prompt on the touch screen of the smart device, is constructed and arranged to:
      generate a random gesture password which includes a random sequence of touch screen gestures, and
      output the random gesture password on the touch screen, the random gesture password including the random sequence of touch screen gestures to enable the user to securely use the random sequence of touch screen gestures as the trial gesture password;
   wherein the control circuitry, when performing the multiple gesture password confirmation operations, is constructed and arranged to:
      re-prompt the user to enter the trial gesture password via the touch screen,
      in response to re-prompting the user to enter the trial gesture password, acquire user input as the user attempts to re-enter the trial gesture password via the touch screen in response to re-prompting, and
      based on the user input, assess ability of the user to re-enter the trial gesture password;
   wherein the control circuitry, when assessing the ability of the user to re-enter the gesture password, is constructed and arranged to:
      detect a graduation event in which the user satisfies a set of gesture password entrance criteria, and
      convert the trial gesture password into an actual gesture password of the user in response to detection of the graduation event.

13. A smart device as in claim 12 wherein the control circuitry, when detecting the graduation event in which the user satisfies the set of gesture password entrance criteria, is constructed and arranged to:
   ascertain that (i) the user has correctly re-entered the trial gesture password a predefined number of times, and (ii) the user has correctly re-entered the trial gesture password after a predefined amount of time has elapsed.

14. A smart device as in claim 12 wherein the control circuitry, when converting the trial gesture password into the actual gesture password of the user, is constructed and arranged to:
   generate a gesture password cryptographic key based on the actual gesture password, and
   after the gesture password cryptographic key is generated, impose a need for the gesture password cryptographic key to access a set of protected resources.

15. A smart device as in claim 12 wherein, prior to displaying the password prompt on the touch screen of the smart device, the smart device temporarily saves a standard password cryptographic key used to unlock access to the set of protected resources, and wherein the control circuitry, when imposing the need for the gesture password cryptographic key to access the set of protected resources, is constructed and arranged to:
- unlock access to the set of protected resources using the standard password cryptographic key,
- lock access to the set of protected resources using the gesture password cryptographic key, and
- delete the standard password cryptographic key from the smart device.

16. A smart device as in claim 12 wherein the control circuitry, when displaying the password prompt includes rendering an array of markers on the touch screen; and wherein receiving the trial gesture password, is constructed and arranged to:
- obtain a series of user gestures in response to the user moving a finger relative to the array of markers.

17. A computer program product having a non-transitory computer readable medium which stores a set of instructions to provide user authentication, the set of instructions, when carried out by computerized circuitry, causing the computerized circuitry to perform a method of:
- displaying a password prompt on a touch screen of a smart device, the password prompt including a motion video of touch screen gestures to prompt a user of the smart device to enter a gesture password;
- receiving a trial gesture password entered by the user via the touch screen, the trial gesture password including a user-entered sequence of touch screen gestures; and
- performing multiple gesture password confirmation operations to verify that the user is able to re-enter the trial gesture password via the touch screen over time to authenticate the user to the smart device;

wherein displaying the password prompt on the touch screen of the smart device includes:
- generating a random gesture password which includes a random sequence of touch screen gestures, and
- outputting the random gesture password on the touch screen, the random gesture password including the random sequence of touch screen gestures to enable the user to securely use the random sequence of touch screen gestures as the trial gesture password;

wherein performing the multiple gesture password confirmation operations includes:
- re-prompting the user to enter the trial gesture password via the touch screen,
- in response to re-prompting the user to enter the trial gesture password, acquiring user input as the user attempts to re-enter the trial gesture password via the touch screen in response to re-prompting, and
- based on the user input, assessing ability of the user to re-enter the trial gesture password;

wherein assessing the ability of the user to re-enter the gesture password includes:
- detecting a graduation event in which the user satisfies a set of gesture password entrance criteria, and
- converting the trial gesture password into an actual gesture password of the user in response to detection of the graduation event.

18. A computer program product as in claim 17 wherein detecting the graduation event in which the user satisfies the set of gesture password entrance criteria includes:
- ascertaining that (i) the user has correctly re-entered the trial gesture password a predefined number of times, and (ii) the user has correctly re-entered the trial gesture password after a predefined amount of time has elapsed.

19. A computer program product as in claim 17 wherein converting the trial gesture password into the actual gesture password of the user includes:
- generating a gesture password cryptographic key based on the actual gesture password, and
- after the gesture password cryptographic key is generated, imposing a need for the gesture password cryptographic key to access a set of protected resources.

20. A computer program product as in claim 17 wherein, prior to displaying the password prompt on the touch screen of the smart device, the smart device temporarily saves a standard password cryptographic key used to unlock access to the set of protected resources, and wherein imposing the need for the gesture password cryptographic key to access the set of protected resources includes:
- unlocking access to the set of protected resources using the standard password cryptographic key,
- locking access to the set of protected resources using the gesture password cryptographic key, and
- deleting the standard password cryptographic key from the smart device.

21. A computer program product as in claim 17 wherein displaying the password prompt includes rendering an array of markers on the touch screen; and wherein receiving the trial gesture password includes:
- obtaining a series of user gestures in response to the user moving a finger relative to the array of markers.

* * * * *